(12) United States Patent
Pasquero et al.

(10) Patent No.: US 9,264,245 B2
(45) Date of Patent: Feb. 16, 2016

(54) METHODS AND DEVICES FOR FACILITATING PRESENTATION FEEDBACK

(75) Inventors: Jerome Pasquero, Kitchener (CA); David Ryan Walker, Waterloo (CA); Steven Henry Fyke, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 489 days.

(21) Appl. No.: 13/634,904

(22) PCT Filed: Feb. 27, 2012

(86) PCT No.: PCT/CA2012/050114
§ 371 (c)(1), (2), (4) Date: Nov. 28, 2012

(87) PCT Pub. No.: WO2013/126984
PCT Pub. Date: Sep. 6, 2013

(65) Prior Publication Data
US 2013/0227420 A1 Aug. 29, 2013

(51) Int. Cl.
*G06F 3/0481* (2013.01)
*H04L 12/18* (2006.01)
*G06Q 10/10* (2012.01)

(52) U.S. Cl.
CPC ............ *H04L 12/1813* (2013.01); *G06Q 10/10* (2013.01)

(58) Field of Classification Search
CPC ......... G06F 3/00; G06F 3/048; G06F 3/0481; G06F 3/0482; G06F 9/44543; G06F 9/4443; H04L 29/06; H04L 12/581
See application file for complete search history.

(56) References Cited

U.S. PATENT DOCUMENTS

| | | | |
|---|---|---|---|
| 6,636,888 B1 | 10/2003 | Bookspan et al. | |
| 7,050,978 B2 | 5/2006 | Silverstein et al. | |
| 7,373,608 B2 | 5/2008 | Lentz | |
| 7,894,849 B2 | 2/2011 | Kass et al. | |
| 8,392,503 B2 * | 3/2013 | Kuhlke et al. | 709/204 |
| 8,647,126 B2 * | 2/2014 | Ahl et al. | 434/365 |
| 2003/0034999 A1 | 2/2003 | Coughlin, III et al. | |
| 2006/0080614 A1 * | 4/2006 | Lentz | 715/753 |
| 2007/0245243 A1 * | 10/2007 | Lanza et al. | 715/723 |
| 2008/0086680 A1 * | 4/2008 | Beckman | 715/230 |
| 2008/0320082 A1 | 12/2008 | Kuhlke et al. | |
| 2009/0094286 A1 | 4/2009 | Lee et al. | |
| 2009/0137257 A1 | 5/2009 | Barber | |
| 2009/0138332 A1 * | 5/2009 | Kanevsky et al. | 705/10 |
| 2009/0143695 A1 | 6/2009 | Mullen et al. | |

(Continued)

OTHER PUBLICATIONS

PCT International Search Report and Written Opinion, relating to application No. PCT/CA2010/050114 dated Nov. 2, 2012.

(Continued)

*Primary Examiner* — Xiomar L Bautista
(74) *Attorney, Agent, or Firm* — Rowand LLP

(57) ABSTRACT

Methods and devices for facilitating presentation feedback during a local presentation are provided. In example embodiments, the local presentation includes an electronic presentation displayed on a display associated with a presentation device. In one aspect, the method comprises: providing a feedback interface for the electronic presentation and allowing one or more mobile communication devices to access the feedback interface; receiving at the feedback interface, feedback information from one or more of the mobile communication devices; and updating the electronic presentation based on the received feedback information.

19 Claims, 12 Drawing Sheets

(56) References Cited

U.S. PATENT DOCUMENTS

| | | | |
|---|---|---|---|
| 2009/0146775 A1 | 6/2009 | Bonnaud et al. | |
| 2009/0241033 A1 | 9/2009 | Mujtaba | |
| 2009/0325142 A1 | 12/2009 | Beavers et al. | |
| 2009/0327896 A1* | 12/2009 | Pall et al. | 715/730 |
| 2010/0037151 A1* | 2/2010 | Ackerman et al. | 715/753 |
| 2010/0131856 A1 | 5/2010 | Kalbfleisch et al. | |
| 2011/0053133 A1 | 3/2011 | Rock et al. | |
| 2011/0169603 A1 | 7/2011 | Fithian et al. | |
| 2011/0320373 A1* | 12/2011 | Lee et al. | 705/319 |
| 2012/0151383 A1* | 6/2012 | Kazan et al. | 715/753 |
| 2012/0284642 A1* | 11/2012 | Sitrick et al. | 715/753 |
| 2014/0006078 A1* | 1/2014 | McGauley et al. | 705/7.15 |
| 2015/0026600 A1* | 1/2015 | Dunn et al. | 715/753 |

OTHER PUBLICATIONS

EPO, Extended European Search Report relating to Application No. 12869721.6, dated Feb. 6, 2015.

Streeter et al.: "A Novel Standard-Compliant Audience Response System for Medical Education", Radiographics, vol. 26, No. 4, Jul. 1, 2006, XP055164420.

Google Apps, Module 4: Docs-Chapter 5: Presentations, http://edutraining.googleapps.com/Training-Home/module-4-docs/chapter-5/5-5, Apr. 3, 2011.

SMS Poll, Start Polling in Four Simple Steps, http://www.smspoll.net/howitworks.php, Feb. 6, 2009.

Get Started in Seconds, URL:www.lecturetools.com, retrieved Nov. 9, 2011.

Instant Audience Feedback, www.polleverywhere.com, retrieved Nov. 9, 2011.

Customer Satisfaction and Reputation Management, http://www.satisfactionsecrets.com/customer-satisfaction/how-to-get-customer-feedback-during-a-powerpoint-presentation-using-twitter/ , posted Dec. 14, 2009.

* cited by examiner

… (US 9,264,245 B2)

METHODS AND DEVICES FOR FACILITATING PRESENTATION FEEDBACK

TECHNICAL FIELD

The present disclosure relates to presentations which include an electronic presentation such as a slide presentation, more particularly, to methods and devices for facilitating audience feedback during such presentations.

BACKGROUND

Local presentations (also referred to herein as in-person presentations) often utilize an electronic presentation such as an electronic slideshow. For example, PowerPoint™ presentations are slideshow-based presentations which are commonly presented in front of a live audience. The live audience is often located in a common area, such as a common room, which is also occupied by the presenter and in which the audience can view a display which displays the electronic presentation.

In such environments, audience members traditionally provide feedback to the presenter by interrupting the presenter and verbally communicating their feedback. For example, it is common for audience members to raise their hand to get the attention of the presenter. The presenter then typically calls upon the audience member with the raised hand and allows them to communicate their feedback. This process is obtrusive since it requires the presenter to interrupt their presentation. Furthermore, the presenter must recognize that someone in the audience has feedback and then call upon that person to provide their feedback. In some circumstances, the presenter may not realize that the audience member wishes to provide feedback and may simply continue the presentation without the feedback from the audience member.

Thus, traditional methods of providing feedback during an in-person presentation may result in feedback not being received or, when feedback is received, the feedback may interfere with the flow of the presentation.

BRIEF DESCRIPTION OF THE DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

In one example aspect, the present disclosure describes a method of facilitating presentation feedback during a local presentation. The local presentation includes an electronic presentation. The electronic presentation is configured for display on a display associated with a presentation device. The method includes: providing a feedback interface for the electronic presentation and allowing one or more mobile communication devices to access the feedback interface; receiving, at the feedback interface, feedback information from one or more of the mobile communication devices; and updating the electronic presentation based on the received feedback information.

In another example aspect, the present disclosure describes a presentation device. The presentation device includes a display interface and a communication interface for communicating with one or more mobile communication devices. The presentation device also includes a processor and a memory. The memory contains computer-readable instructions for causing the processor to: provide a feedback interface for an electronic presentation and allow one or more mobile communication devices to access the feedback interface; receive at the feedback interface, feedback information from one or more of the mobile communication devices; and update the electronic presentation based on the received feedback information.

In yet another example aspect, the present disclosure describes a feedback interface server. The feedback interface server includes one or more communication interfaces for communicating with one or more mobile communication devices and a presentation device. The feedback interface server also includes a processor and a memory containing computer-readable instructions for causing the processor to: provide a feedback interface for an electronic presentation and allow one or more mobile communication devices to access the feedback interface; receive, at the feedback interface, feedback information from one or more of the mobile communication devices; and update the electronic presentation based on the received feedback information.

Other example embodiments of the present disclosure will be apparent to those of ordinary skill in the art from a review of the following detailed description in conjunction with the drawings.

Example Feedback Providing System

Figure 1:
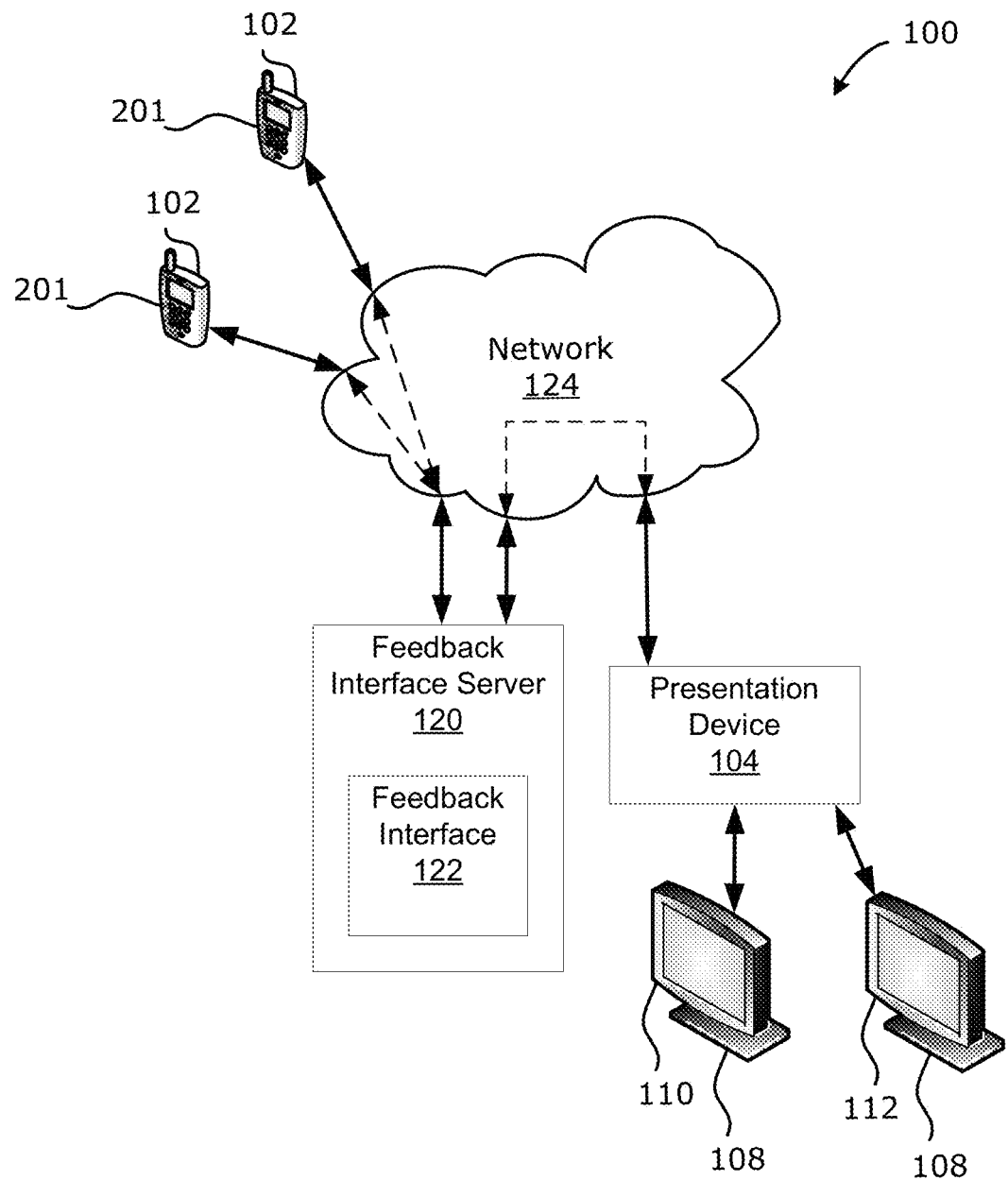
FIG. 1 is a block diagram of a feedback providing system in accordance with example embodiments of the present disclosure.

Reference will now be made to FIG. 1 which illustrates an example feedback providing system 100. The feedback providing system 100 is configured to allow an audience for an in-person presentation to provide feedback to the presenter of that presentation. The feedback providing system 100 includes one or more feedback providing devices 102 to effectively communicate with a presentation device 104 to provide feedback to the presentation device 104.

The feedback providing devices 102 may be deployed among audience members in the presentation. That is, in at least some example embodiments, the presentation may be an in-person presentation in which the presenter is delivering a presentation to a local audience. In at least some example embodiments, the feedback providing devices 102 which are deployed among the audience members may be mobile communication devices 201. Such mobile communication devices 201 may, for example, be smartphones and/or tablet computers. In at least some example embodiments, one or more of the feedback providing devices 102 may be traditional computers, such as laptops computers. The feedback providing devices 102 may be deployed within the acoustical range of the presenter giving the presentation, so that for example feedback may be provided regarding the acoustics of the presentation. However, in at least some example embodiments, the acoustical range may be enhanced using one or more speakers. In such example embodiments, the feedback providing devices 102 may be deployed within the acoustical range of the speakers. Example feedback providing devices 102 will be discussed in greater detail below with reference to FIG. 2.

The example feedback providing system 100 of FIG. 1 includes a presentation device 104. The presentation device 104 may be a computing device such as a laptop, desktop, notebook, or tablet-style computer. In at least some example embodiments, the presentation device 104 may be a mobile communication device 201 of the type described below with reference to FIG. 2. As will be described in greater detail below with reference to FIG. 3, the presentation device 104 may include a presentation application which is configured to provide an electronic presentation. The electronic presentation may, for example, be an electronic slide presentation, such as a PowerPoint™ presentation. In such example embodiments, the presentation application may be referred to as a slide presentation application. The presentation application may be configured to allow a presenter to prepare a presentation (e.g. to prepare slides for the presentation). The presentation application may also allow a presenter to display the presentation on one or more displays 108.

In at least some example embodiments, the presentation device 104 may include or be connected to an audience display 110. The audience display 110 is a display 108 which is generally configured to be viewed by the audience of the presentation. The presentation device 104 may also include or be connected to a presenter display 112. The presenter display 112 may, in at least some example embodiments, be smaller than the audience display 110. In at least some example embodiments, the presentation application may be configured to display content on the presenter display 112 which is not displayed on the audience display 110. For example, the presentation application may be configured to display private information for the presenter which may not be viewed by the audience. Such private information may include, for example, speaker notes. Speaker notes are notes which may be useful to the person delivering the presentation, but which are not meant for viewing by the audience. Accordingly, the electronic presentation which is displayed on the audience display may be different from the electronic presentation which is displayed on the presenter display. That is, in some example embodiments, the presenter display 112 may display information which is not displayed on the audience display 110.

The presentation device 104 may be configured to receive feedback information from the feedback providing devices 102 and to update an electronic presentation displayed on one or more of the displays 108 based on that feedback information. For example, in at least some example embodiments, the presenter display 112 may be updated based on the feedback information. In at least some example embodiments, the audience display 110 may be updated based on the feedback information.

In at least some example embodiments, the feedback providing system 100 includes a feedback interface server 120. The feedback interface server 120 may act as an intermediary between the feedback providing devices 102 and the presentation device 104. For example, the feedback interface server 120 may communicate with the feedback providing devices 102 and may also communicate with the presentation device 104. The feedback interface server 120 may provide a feedback interface 122 which allows the feedback providing devices 102 to communicate feedback information to the feedback interface server 120. The feedback interface 122 may, for example, be a front-end to the feedback interface server 120 for the electronic presentation on the presentation device 104.

The feedback interface 122 may be associated with a specific electronic presentation on the presentation device 104. The feedback interface 122 may, for example, be a web portal (such as a webpage) which allows the feedback providing devices 102 to access the feedback interface server 120 in order to provide feedback. In at least some example embodiments, the feedback interface server 120 is a web server. The feedback interface server 120 may, in at least some example embodiments, host a plurality of feedback interfaces 122. That is, the feedback interface server 120 may allow feedback information to be received for a plurality of electronic presentations. Feedback information which is received at the feedback interface server 120 may include identifying information such as login information, which allows the feedback interface server 120 to determine which electronic presentation the feedback information is associated with. The feedback interface server 120 will be described in greater detail below with reference to FIG. 4.

In the example embodiment of FIG. 1, the feedback providing devices 102 connect to the feedback interface server 120 via a network 124. Similarly, in the example embodiment shown, the feedback interface server 120 connects to the presentation device 104 via the network 124. The network 124 may include a private network, or a public network, such as the Internet. In other example embodiments, the network 124 may not be utilized. Instead, the feedback providing devices 102 may connect to the feedback interface server 120 via a more direct connection. Similarly, in some example embodiments, the feedback interface server 120 may connect to the presentation device 104 via a more direct connection.

Example Feedback Providing Device

Figure 2:
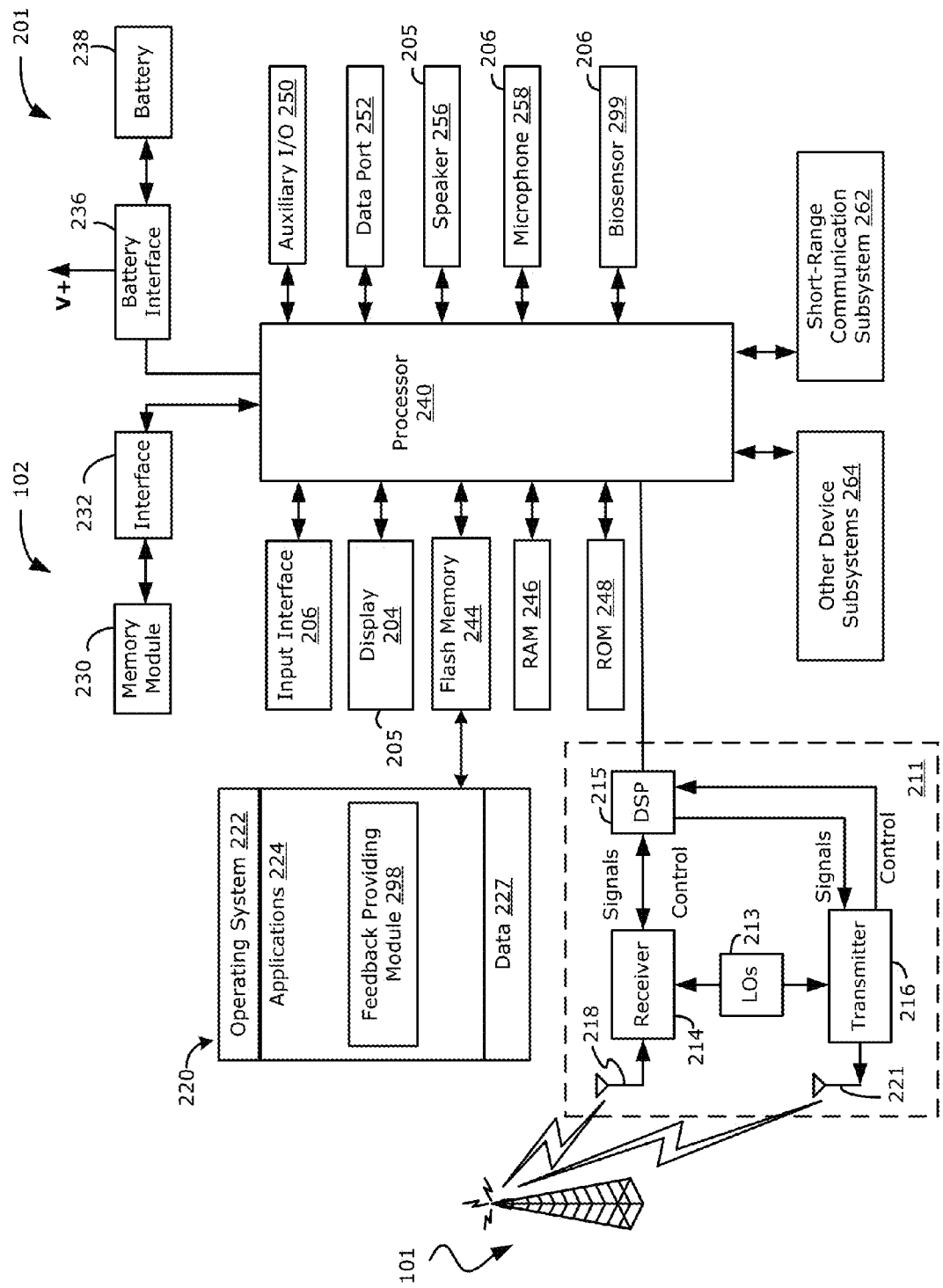
FIG. 2 is a block diagram of a feedback providing device in accordance with example embodiments of the present disclosure.

Reference is now made to FIG. 2 which illustrates an example feedback providing device 102. The feedback providing device 102 is an electronic device. In the illustrated example embodiment, the feedback providing device is a mobile communication device 201. In at least some example embodiments, the mobile communication device 201 is a two-way communication device having data and voice communication capabilities, and the capability to communicate with other computer systems, for example, via the Internet. Depending on the functionality provided by the mobile communication device 201, in various example embodiments the mobile communication device 201 may be a multiple-mode communication device configured for both data and voice communication, a mobile telephone such as a smartphone, a tablet computer such as a slate computer, a wearable computer such as a watch, a PDA (personal digital assistant) or a computer system.

A smartphone is a mobile phone which offers more advanced computing capability than a basic non-smartphone cellular phone. For example, a smartphone may have the ability to run third party applications which are stored on the smartphone.

A tablet computer (which may also be referred to as a tablet) is a mobile communication device 201 which is generally larger than a mobile phone (such as a smartphone) or personal digital assistant. Many mobile phones or personal digital assistants are designed to be pocket sized. That is, mobile phones or personal digital assistants are generally small enough to be carried by a person easily, often in a shirt or pant pocket, while tablet computers are larger and may not fit within pant pockets. For example, many tablet computers have a height which is seven inches (7") or more. In some example embodiments, the tablet computer may be a slate computer. A slate computer is a tablet computer which does not include a dedicated keyboard. A slate computer may allow for text input through the use of a virtual keyboard or an external keyboard which connects to the slate computer via a wired or wireless connection.

In other example embodiments, the mobile communication device 201 may be of a type not specifically listed above.

The mobile communication device 201 includes a housing (not shown) which houses components of the mobile communication device 201. Internal components of the mobile communication device 201 may be constructed on a printed circuit board (PCB). The mobile communication device 201 includes a controller including at least one processor 240 (such as a microprocessor) which controls the overall operation of the mobile communication device 201. The processor 240 interacts with device subsystems such as a wireless communication subsystem 211 for exchanging radio frequency signals with a wireless network 101 to perform communication functions. The wireless network 101 may include or be connected to the network 124 of FIG. 1 The processor 240 interacts with additional device subsystems including one or more input interfaces 206 (such as a keyboard, one or more control buttons, one or more biosensors 299, one or more microphones 258, and/or a touch-sensitive overlay associated with a touchscreen display), flash memory 244, random access memory (RAM) 246, read only memory (ROM) 248, auxiliary input/output (I/O) subsystems 250, a data port 252 (which may be a serial data port, such as a Universal Serial Bus (USB) data port), one or more output interfaces 205 (such as a display 204 (which may be a liquid crystal display (LCD)), one or more speakers 256, or other output interfaces 205), a short-range communication subsystem 262, and other device subsystems generally designated as 264. Some of the subsystems shown in FIG. 2 perform communication-related functions, whereas other subsystems may provide "resident" or on-device functions.

The mobile communication device 201 may include a touchscreen display in some example embodiments. The touchscreen display may be constructed using a touch-sensitive input surface connected to an electronic controller. The touch-sensitive input surface overlays the display 204 and may be referred to as a touch-sensitive overlay. The touch-sensitive overlay and the electronic controller provide a touch-sensitive input interface 206 and the processor 240 interacts with the touch-sensitive overlay via the electronic controller. That is, the touchscreen display acts as both an input interface 206 and an output interface 205.

The communication subsystem 211 includes a receiver 214, a transmitter 216, and associated components, such as one or more antenna elements 218 and 221, local oscillators (LOs) 213, and a processing module such as a digital signal processor (DSP) 215. The antenna elements 218 and 221 may be embedded or internal to the mobile communication device 201 and a single antenna may be shared by both receiver 214 and transmitter 216, as is known in the art. The particular design of the wireless communication subsystem 211 depends on the wireless network 101 in which the mobile communication device 201 is intended to operate.

The mobile communication device 201 may communicate with any one of a plurality of fixed transceiver base stations of the wireless network 101 within its geographic coverage area. The mobile communication device 201 may send and receive communication signals over the wireless network 101 after the required network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 215. In a similar manner, signals to be transmitted are processed, including modulation and encoding, for example, by the DSP 215. These DSP-processed signals are input to the transmitter 216 for digital-to-analog (D/A) conversion, frequency up conversion, filtering, amplification, and transmission to the wireless network 101 via the antenna 221. The DSP 215 not only processes communication signals, but may also provide for receiver and transmitter control. For example, the gains applied to communication signals in the receiver 214 and the transmitter 216 may be adaptively controlled through automatic gain control algorithms implemented in the DSP 215.

In some example embodiments, the auxiliary input/output (I/O) subsystems 250 may include an external communication link or interface, for example, an Ethernet connection. The mobile communication device 201 may include other wireless communication interfaces for communicating with other types of wireless networks, for example, a wireless network such as an orthogonal frequency division multiplexed (OFDM) network. The auxiliary I/O subsystems 250 may include a pointing or navigational tool (input device) such as a clickable trackball or scroll wheel or thumbwheel, or a vibrator for providing vibratory notifications in response to various events on the mobile communication device 201 such as receipt of an electronic message or incoming phone call, or for other purposes such as haptic feedback (touch feedback).

In some example embodiments, the mobile communication device 201 also includes a removable memory module 230 (typically including flash memory) and a memory module interface 232. Network access may be associated with a subscriber or user of the mobile communication device 201 via the memory module 230, which may be a Subscriber Identity Module (SIM) card for use in a GSM network or other type of memory module for use in the relevant wireless network type. The memory module 230 may be inserted in or connected to the memory module interface 232 of the mobile communication device 201.

The mobile communication device 201 may store data 227 in an erasable persistent memory, which in one example embodiment is the flash memory 244. In various example embodiments, the data 227 may include service data having information required by the mobile communication device 201 to establish and maintain communication with the wireless network 101. The data 227 may also include user application data such as email messages, address book and contact information, calendar and schedule information, notepad documents, image files, and other commonly stored user information stored on the mobile communication device 201 by its user, and other data. The data 227 stored in the persistent memory (e.g. flash memory 244) of the mobile communication device 201 may be organized, at least partially, into a number of databases or data stores each containing data items of the same data type or associated with the same application. For example, email messages, contact records, and task items may be stored in individual databases within the mobile communication device 201 memory.

The data port 252 may be used for synchronization with a user's host computer system. The data port 252 enables a user to set preferences through an external device or software application and extends the capabilities of the mobile communication device 201 by providing for information or software downloads to the mobile communication device 201 other than through the wireless network 101. The alternate download path may for example, be used to load an encryption key onto the mobile communication device 201 through a direct, reliable and trusted connection to thereby provide secure device communication.

In some example embodiments, the mobile communication device 201 is provided with a service routing application programming interface (API) which provides an application with the ability to route traffic through a serial data (i.e., USB) or Bluetooth® (Bluetooth® is a registered trademark of Bluetooth SIG, Inc.) connection to the host computer system using standard connectivity protocols. When a user connects their mobile communication device 201 to the host computer system via a USB cable or Bluetooth® connection, traffic that was destined for the wireless network 101 is automatically routed to the mobile communication device 201 using the USB cable or Bluetooth® connection. Similarly, any traffic destined for the wireless network 101 is automatically sent over the USB cable Bluetooth® connection to the host computer for processing.

The mobile communication device 201 also includes a battery 238 as a power source, which is typically one or more rechargeable batteries that may be charged, for example, through charging circuitry coupled to a battery interface 236 such as the serial data port 252. The battery 238 provides electrical power to at least some of the electrical circuitry in the mobile communication device 201, and the battery interface 236 provides a mechanical and electrical connection for the battery 238. The battery interface 236 is coupled to a regulator (not shown) which provides power V+ to the circuitry of the mobile communication device 201.

The short-range communication subsystem 262 is an additional optional component which provides for communication between the mobile communication device 201 and different systems or devices, which need not necessarily be similar devices. For example, the short-range communication subsystem 262 may include an infrared device and associated circuits and components, or a wireless bus protocol compliant communication mechanism such as a Bluetooth® communication module to provide for communication with similarly-enabled systems and devices.

A predetermined set of applications that control basic device operations, including data and possibly voice communication applications may be installed on the mobile communication device 201 during or after manufacture. Additional applications and/or upgrades to an operating system 222 or software applications 224 may also be loaded onto the mobile communication device 201 through the wireless network 101, the auxiliary I/O subsystem 250, the data port 252, the short-range communication subsystem 262, or other suitable device subsystems 264. The downloaded programs or code modules may be permanently installed, for example, written into the program memory (e.g. the flash memory 244), or written into and executed from the RAM 246 for execution by the processor 240 at runtime.

In some example embodiments, the mobile communication device 201 may provide two principal modes of communication: a data communication mode and a voice communication mode. In the data communication mode, a received data signal such as a text message, an email message, or webpage download will be processed by the communication subsystem 211 and input to the processor 240 for further processing. For example, a downloaded webpage may be further processed by a web browser or an email message may be processed by the email messaging application and output to the display 204. A user of the mobile communication device 201 may also compose data items, such as email messages; for example, using an input interface 206 in conjunction with the display 204. These composed items may be transmitted through the communication subsystem 211 over the wireless network 101.

In the voice communication mode, the mobile communication device 201 provides telephony functions and may operate as a typical cellular phone. The overall operation is similar to the data communication mode, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input devices). Alternative voice or audio I/O subsystems, such as a voice message recording subsystem, may also be implemented on the mobile communication device 201. Although voice or audio signal output may be accomplished primarily through the speaker 256, the display 204 may also be used to provide an indication of the identity of a calling party, duration of a voice call, or other voice call related information.

The processor 240 operates under stored program control and executes software modules 220 stored in memory such as persistent memory; for example, in the flash memory 244. As illustrated in FIG. 2, the software modules 220 may include operating system software 222 and one or more additional applications 224 or modules, such as a feedback providing module 298. In the example embodiment of FIG. 2, the feedback providing module 298 is implemented as a separate stand-alone application 224, but in other example embodiments, the feedback providing module 298 could be implemented as part of the operating system 222 or another application 224.

Figure 5:
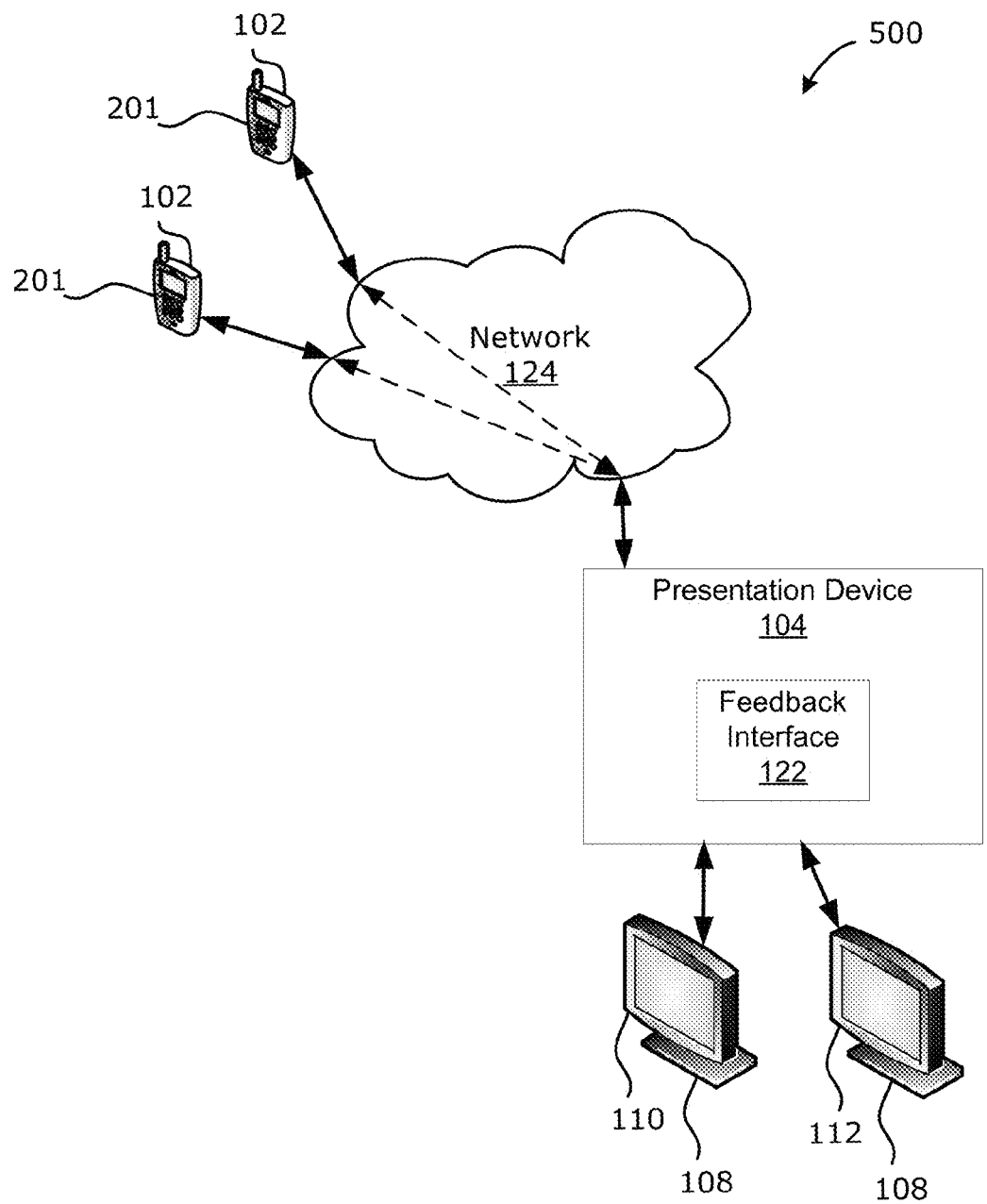
FIG. 5 is a block diagram of a feedback providing system in accordance with example embodiments of the present disclosure.

The feedback providing module 298 may be configured to allow the mobile communication device 201 to connect to a feedback interface 122 (of FIG. 1 and FIG. 5) and to provide feedback information to the feedback interface 122 (of FIG. 1 or 5). In at least some example embodiments, the feedback providing module 298 is a web browser which is configured to provide feedback information via a web page. However, in other example embodiments, the feedback providing module 298 is a more specialized module which is designed specifically for the purpose of providing feedback information.

The mobile communication device 201 may include a range of additional software applications 224, including, for example, a notepad application, voice communication (i.e. telephony) application, mapping application, a media player application, or any combination thereof. Each of the software applications 224 may include layout information defining the placement of particular fields and graphic elements (e.g. text fields, input fields, icons, etc.) in the user interface (i.e. the display 204) according to the application.

The software modules 220 or parts thereof may be temporarily loaded into volatile memory such as the RAM 246. The RAM 246 is used for storing runtime data variables and other types of data or information. Although specific functions are described for various types of memory, this is merely one example, and a different assignment of functions to types of memory could also be used.

As noted above, in at least some example embodiments, the mobile communication device 201 includes, or may be connected to, a biosensor 299. The biosensor 299 is configured to obtain information about a user of the mobile communication device 201. For example, the biosensor 299 may be configured to obtain health information about a user of the mobile communication device 201. In some example embodiments, the biosensor 299 is a heartbeat sensor which obtains heartbeat data from a user. In at least some example embodiments, the feedback providing module 298 is configured to provide the biosensor data to the feedback interface 122 (of FIG. 1 or FIG. 5). That is, the biosensor data may act as feedback information during a presentation.

Example Presentation Device

Figure 3:
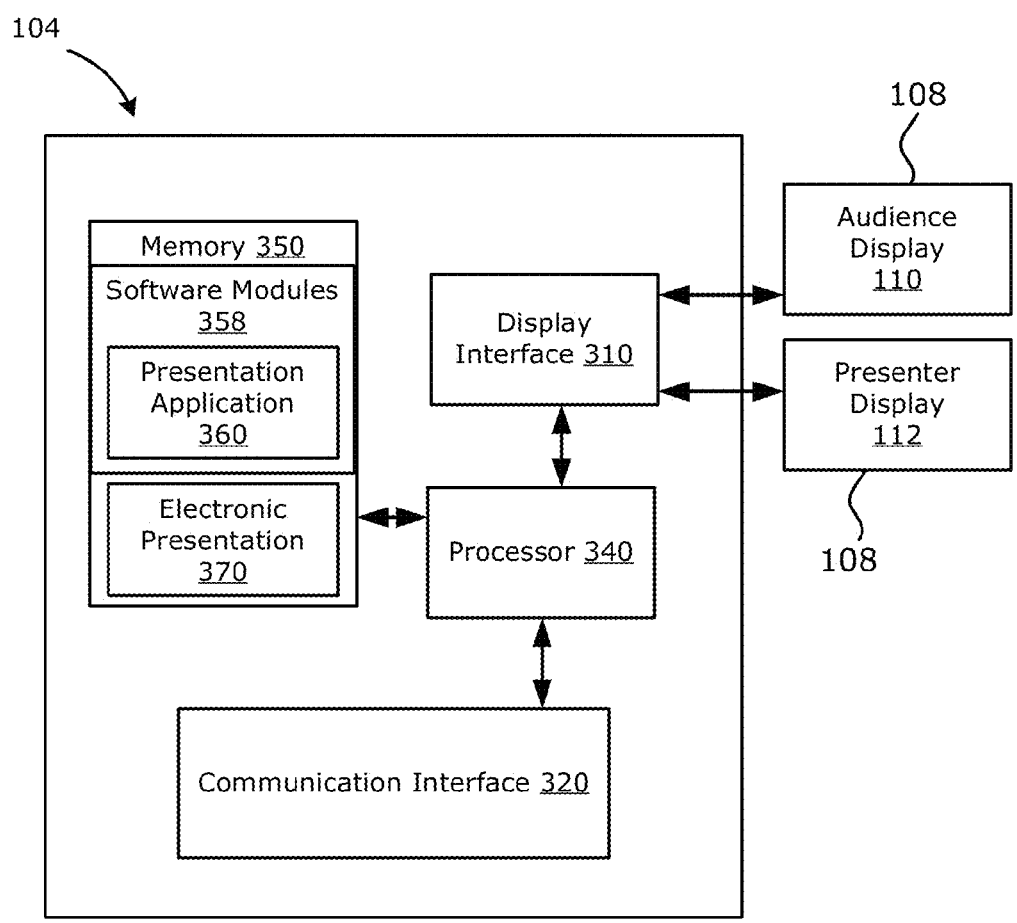
FIG. 3 is a block diagram of a presentation device in accordance with example embodiments of the present disclosure.

Reference is now made to FIG. 3, which shows, in block diagram form, an example presentation device 104. The presentation device 104 is configured to assist a presenter by displaying an electronic presentation 370. More particularly, the presentation device 104 may be configured to display an electronic presentation 370 on one or more displays 108 associated with the presentation device. In at least some example embodiments, the presentation device is a laptop computer. In other example embodiments, the presentation device 104 is a desktop computer. In yet another example embodiment, the presentation device 104 may be a smartphone or other mobile communication device 201, such as the mobile communication device 201 described above with reference to FIG. 2. The presentation device 104 may take other forms apart from those specifically listed above.

The presentation device 104 includes a controller (including one or more processors 340) which controls the overall operation of the presentation device 104. The presentation device 104 may also include a memory 350 which is communicably connected to the processor 340. The memory 350 may be configured to provide data stored in the memory 350 to the processor 340. For example, the memory 350 may include computer-readable instructions for causing the processor 340 to perform a method such as, for example, one or more of the methods 700, 800, 900 described below with reference to FIGS. 7 to 9. The memory 350 may also store other data not specifically referred to herein.

While the memory 350 is illustrated as a single component, it will typically include multiple memory components of various types. For example, the memory 350 may include random access memory (RAM), read-only memory (ROM), a hard disk drive (HDD), a solid state drive (SSD), flash memory, or other types of memory. It will be appreciated that each of the various memory types will be best suited for different purposes and applications.

The processor 340 may operate under stored program control and may execute software modules 358 stored on the memory 350. The software modules 358 may, in at least some example embodiments, include a presentation application 360. The presentation application 360 is an application which is configured to create and/or display an electronic presentation 370, which may be stored in memory 350 of the presentation device 104. In at least some example embodiments, the presentation application 360 is a slide presentation application which is configured to display an electronic slide presentation. The electronic presentation 370 may, in some example embodiments, be organized as a series of slides. The electronic presentation 370 may include, for example, graphics, text, video, animations, or other features not specifically listed above. By way of example, in at least some example embodiments, the presentation application 360 may be a PowerPoint™ application or another presentation application which provides functions and features which are similar to the PowerPoint™ application. In at least some example embodiments, the presentation application 360 or another application or module on the memory 350, may be configured to update a displayed electronic presentation 370 based on feedback information received from a feedback providing device 102 (of FIG. 1). For example, the presentation application 360 may be configured to display feedback information so that such information is viewable by the presenter. The display of such feedback information and other methods of updating the electronic presentation 370 based on the feedback information will be discussed in greater detail below with reference to FIGS. 7 to 9.

The presentation application 360 may be configured to allow a user of the presentation device 104 to create an electronic presentation 370. More particularly, the presentation application 360 may include tools and features which allow a user to define the content and layout of the electronic presentation 370. By way of example and not limitation, a user may be permitted to input text or graphics onto slides and to specify playback information such as the manner in which such text or graphics will be displayed or the playback speed of the presentation.

In at least some example embodiments, the presentation application 360 may be configured to utilize multiple displays 108. More particularly, the presentation application 360 may, in a least some example embodiments, be configured to display the electronic presentation on an audience display 110 associated with the presentation device 104. The audience display 110 is a display 108 which is meant to be viewed by the audience (e.g. people who may be in the same room as the presenter, but who are not themselves the presenter). The presentation application 360 may also be configured to display a presenter view of the electronic presentation 370 on a presenter display 112. The presenter display 112 is a display 108 which is configured to be viewed by the presenter, but not by the audience. That is, the presenter display 112 is configured to be viewed by a person or persons who are themselves presenters of the presentation. The presenter view, which is displayed on the presenter display 112 may include one or more features which are not displayed on the audience display 110. For example, in at least some example embodiments, the presenter display 112 displays speaker notes. Speaker notes are talking points or other cues for the presenter which are not intended to be viewed by the audience and are not displayed on the audience display 110.

As will be described in greater detail below with reference to FIGS. 7 to 9, in at least some example embodiments, the presenter display 112 may be updated based on the feedback information received from a feedback providing device 102. That is, the electronic presentation 370 displayed on the presenter display 112 may be updated based on the feedback information (i.e. the presenter view may be updated). In at least some example embodiments, the audience display 110 may be updated based on the feedback information. That is, in at least some example embodiments, the electronic presentation 370 displayed on the audience display 110 may be updated based on the feedback information received from the feedback providing device (i.e. an audience view may be updated). However, in at least some example embodiments, only the presenter display 112 may be updated based on the feedback information. That is, in at least some example embodiments, the audience will not be permitted to see feedback information or information derived from the feedback information. In at least some example embodiments, the audience display 110 is not updated based on the feedback information.

The electronic presentation 370 may, in at least some example embodiments, be stored in memory 350 of the presentation device 104. However, in other example embodiments, the electronic presentation 370 may be stored elsewhere. For example, the electronic presentation 370 may be stored remotely from the presentation device 104. During the presentation or prior to the presentation, the presentation application 360 may retrieve the electronic presentation 370 from another device, system, or server.

The presentation device 104 may include a display interface 310 which is configured to interact with one or both of the displays 108. By way of example, in at least some example embodiments, the display interface 310 may be a video card. The display interface 310 may control output to the displays 108. For example, the display interface 310 may create video signals, which are capable of being processed by one or more displays 108.

In the example embodiment illustrated, the audience display 110 and the presenter display 112 are both illustrated as being external to the presentation device 104. In such example embodiments, the displays 108 may be connected to the presentation device 104 via wired or wireless communications. However, in other example embodiments, one or both of the displays 108 may be internal to the presentation device 104. For example, in at least some example embodiments, the presenter display 112 may be internal to the presentation device 104. For example, as noted above, in some example embodiments, a laptop-based presentation device 104 (i.e. laptop computer) may be used. The laptop computer may include an internal display which may be used as the presenter display 112.

The presentation device 104 may include one or more communication interfaces 320 for communicating with other systems, servers, or devices. For example, in some example embodiments, a communication interface 320 may be provided on the presentation device 104 to allow the presentation device 104 to communicate over the network 124 (of FIG. 1) with devices, servers, or systems which are connected to that network 124. For example, in at least some example embodiments, the communication interface 320 may be a wireless communication interface such as Wi-Fi or Bluetooth or may be a communication interface 320 which is configured to communicate via wired communications, such as Ethernet communications. The communication interface 320 may take other forms apart from those specifically listed herein. In at least some example embodiments, the communication interface 320 permits the presentation device 104 to communicate with the feedback interface server 120 (of FIG. 1) and/or one or more feedback providing devices 102 (of FIG. 1).

The presentation device 104 may include other features, components, or subsystems apart from those specifically discussed herein. By way of example, the presentation device 104 will include a power sub-system which interfaces with a power source for providing electrical power to the presentation device 104 and its components. By way of further example, the presentation device 104 may include one or more input devices. The input devices may include a navigational input device and/or an alphanumeric input device. By way of example, an input device may be a mouse, a track pad, a track ball, a touch-screen overlay, or another input device not specifically listed herein. The input device may allow the presenter to control playback of the electronic presentation 370. For example, the input device may permit the presenter to instruct the presentation device 104 to begin playback of the presentation, navigate to a next slide or a previous slide, or to control the electronic presentation 370 in other ways.

The software modules 358 may be logically or physically organized in a manner that is different than the manner illustrated in FIG. 3. By way of example, in at least some example embodiments, the features described herein with reference to the presentation application 360 may be provided by other software applications or modules and may be divided so that they are provided by more than one software application or module. That is, functions which are described with reference to a single software application or module may be provided by a plurality of software applications or modules. Thus, the software modules 358 described with reference to FIG. 3 represent one possible assignment of features to software modules. However, such features may be organized in other ways in other example embodiments.

Furthermore, in the presentation device 104 may include other software applications or modules which provide features which are not specifically discussed herein. For example, the presentation device 104 may include operating system software which controls the overall operation of the presentation device 104.

Example Feedback Interface Server

Figure 4:
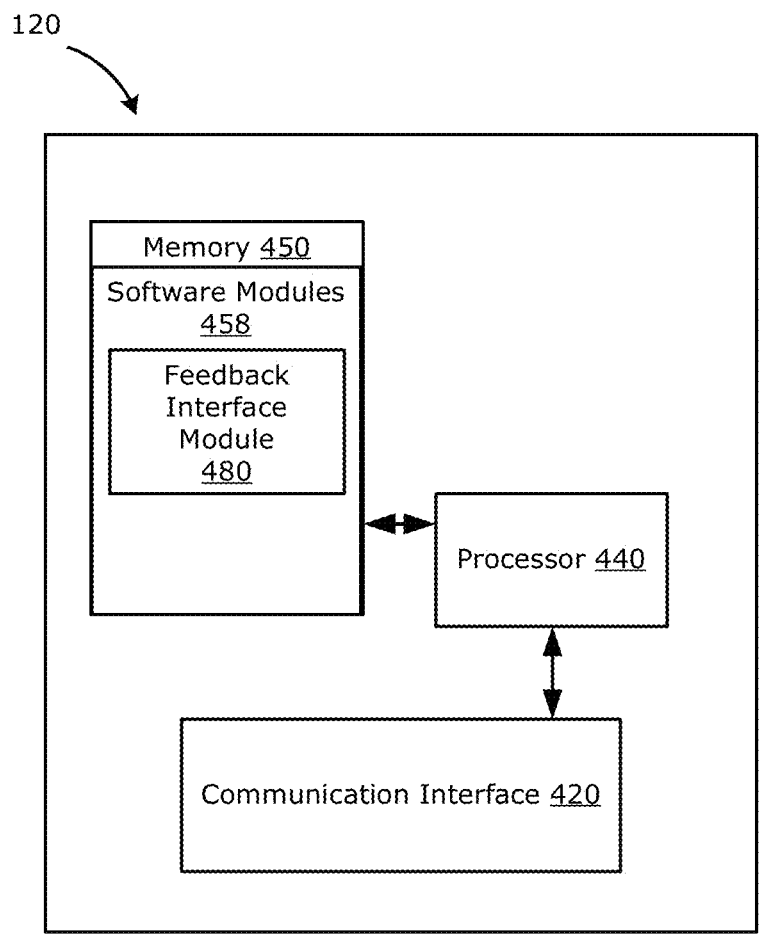
FIG. 4 is a block diagram of a feedback interface server in accordance with example embodiments of the present disclosure.

Referring now to FIG. 4, a block diagram of an example feedback interface server 120 is illustrated. The feedback interface server 120 includes a controller (including one or more processors 440) which controls the overall operation of the feedback interface server 120.

The feedback interface server 120 includes a memory 450 which is connected to the processor 440 for receiving and sending data to the processor 440. While the memory 450 is illustrated as a single component, it will typically include multiple memory components of various types. For example, a memory 450 may include random access memory (RAM), read-only memory (ROM), a hard-disk drive (HDD), a solid-state drive (SSD), flash memory, or other types of memory. It will be appreciated that each of the various memory types will be best suited for different purposes and applications. The memory 450 may also store other data not specifically referred to above.

The processor 440 may operate under stored program control and may execute software modules 458 stored on the memory 450. In at least some example embodiments, the software modules 458 may include a feedback interface module 480.

The feedback interface module 480 may be configured to provide a feedback interface 122 (of FIG. 1). The feedback interface 122 may be associated with a specific electronic presentation 370 (of FIG. 3). The feedback interface server 120 may allow one or more feedback providing devices 102, such as the mobile communication devices 201 of FIG. 2, to provide feedback information via the feedback interface 122. That is, the feedback interface server 120 may allow one or more feedback providing devices 102 to access the feedback interface 122. In at least some example embodiments, the feedback interface module 480 is configured to provide a displayable page such as a webpage to the feedback providing device 102. The displayable page allows the feedback providing device 102 to input information to the feedback interface server 120. The feedback providing device 102 may provide feedback information regarding the electronic presentation via the feedback interface 122. Such feedback information may, for example, represent an audience member's view, opinions, thoughts and/or belief about the presentation.

In at least some example embodiments, a feedback providing device 102 may be permitted to submit feedback interface access information associated with an electronic presentation to the feedback interface server 120. The feedback interface server 120 uses the feedback interface access information to identify the specific electronic presentation 370 (of FIG. 3) which the feedback providing device 102 is providing feedback for. For example, in at least some example embodiments, the feedback interface access information may include login information which is associated with an electronic presentation. Such login information may include, for example, a user name, password, or other unique identifying information associated with the electronic presentation 370.

The feedback interface module 480 may be configured to receive the feedback information and may, in at least some example embodiments, analyze the feedback information. In at least some example embodiments, the feedback interface server 120 may provide the feedback information or information derived from the feedback information to the presentation device 104 (of FIG. 3) during the presentation. By doing so, the feedback interface server 120 effectively updates the electronic presentation displayed on a display associated with the presentation device 104 based on the received feedback information. That is, the feedback interface server 120 provides the feedback information or information derived from the feedback information to the presentation device which then uses such information to update the electronic presentation which is displayed on a display 108 associated with the presentation device 104. For example, an electronic presentation displayed on a display 108 may be updated to include the feedback information. Thus, the presenter and/or the audience are provided with feedback information or information derived from feedback information during the presentation. The feedback interface module 480 will be described in greater detail below with reference to FIGS. 7 to 9.

The feedback interface server 120 also includes one or more communication interfaces 420. The communication interfaces are configured to allow the feedback interface server 120 to communicate with other systems, servers, or devices which may be accessible over a network 124 (of FIG. 1). For example, in at least some example embodiments, the feedback interface server 120 may include a communication interface 420 which allows the feedback interface server 120 to communicate with one or more feedback providing devices 102 (of FIG. 1). A communication interface 420 on the feedback interface server 120 may also allow the feedback interface server 120 to communicate with the presentation device 104. The communication interface 420 which allows the feedback interface server 120 to communicate with the presentation device 104 may be the same communication interface which is used to allow the feedback interface server 120 to communicate with the feedback providing device 102. The communication interface 420 may be configured for wired or wireless communications. By way of example, the communication interface 420 may be a Wi-Fi, Bluetooth, or Ethernet communication interface.

The feedback interface server 120 may include other features, components, or subsystems apart from those specifically discussed herein. By way of example and not limitation, the feedback interface server 120 will include a power subsystem which interfaces with a power source for providing electrical power to the feedback interface server 120 and its components. By way of further example, the feedback interface server 120 may include a display sub-system for interfacing with a display such as a computer monitor and, in at least some example embodiments, an input sub-system for interfacing with an input device. The input device may, for example, include an alphanumeric input device, such as a computer keyboard and/or a navigational input device such as a mouse.

The software modules 458 may be logically or physically organized in a manner that is different from the manner illustrated in FIG. 4. By way of example, in some example embodiments, functions which are described with reference to the feedback interface module 480 may be provided by a plurality of modules or applications. Thus, the software modules 458 of FIG. 4 represent one possible assignment of features to software modules. However, such features may be organized in other ways in other example embodiments.

Example Feedback Providing System

FIGS. 1 to 4 illustrate an example embodiment in which a feedback interface server 120, such as web server, was used to facilitate the delivery of feedback information from feedback providing devices 102 to a presentation device 104. However, in other example embodiments, feedback information may be provided more directly from a feedback providing device 102 to the presentation device 104. In at least some example embodiments, the feedback providing system may not include a feedback interface server 120 to act as an intermediary between the feedback providing devices 102 in the presentation device 104. Instead, the feedback providing devices 102 may provide the feedback information directly to the presentation device 104.

An overview having been provided, reference will now be made to FIG. 5, which illustrates an example embodiment of a feedback providing system 500, which does not include feedback interface server 120. The feedback providing system 500 of FIG. 5 includes many of the components which are discussed above with reference to FIG. 1 and which are described in greater detail with reference to FIGS. 2 to 4. For example, the feedback providing system 500 includes one or more feedback providing devices 102. The feedback providing devices 102 may be mobile communication devices 201 and may be deployed in the manner described above with reference to FIG. 1.

The feedback providing system 500 also includes a presentation device 104 which may be associated with one or more displays 108 (e.g. an audience display 110, and/or a presenter display 112). The presentation device 104 and displays 108 are also described in greater detail above with reference to FIG. 1 and FIG. 3. In the example embodiment of FIG. 5, the presentation device 104 includes a feedback interface 122. That is, unlike in the example embodiment of FIG. 1 in which the feedback interface 122 is provided by a feedback interface server 120, in the embodiment of FIG. 5, the feedback interface 122 is provided by the presentation device 104. The feedback interface 122 provided by the presentation device 104 may be the same or similar which is provided by the feedback interface server 120 of FIG. 1. For example, the feedback interface 122 may allow the feedback providing devices 102 to communicate feedback information to the presentation device 104. The feedback interface 122 may, therefore, be a front-end to the presentation device 104.

The feedback providing device 102 may be connected to the presentation device 104 either directly or through a network 124 which may be of the type described above with reference to FIG. 1. In at least some example embodiments, the feedback providing device 102 is connected to the presentation device 104 via a wireless connection such as, for example, a Wi-Fi connection or a Bluetooth connection, or via another connection protocol.

Figure 6:
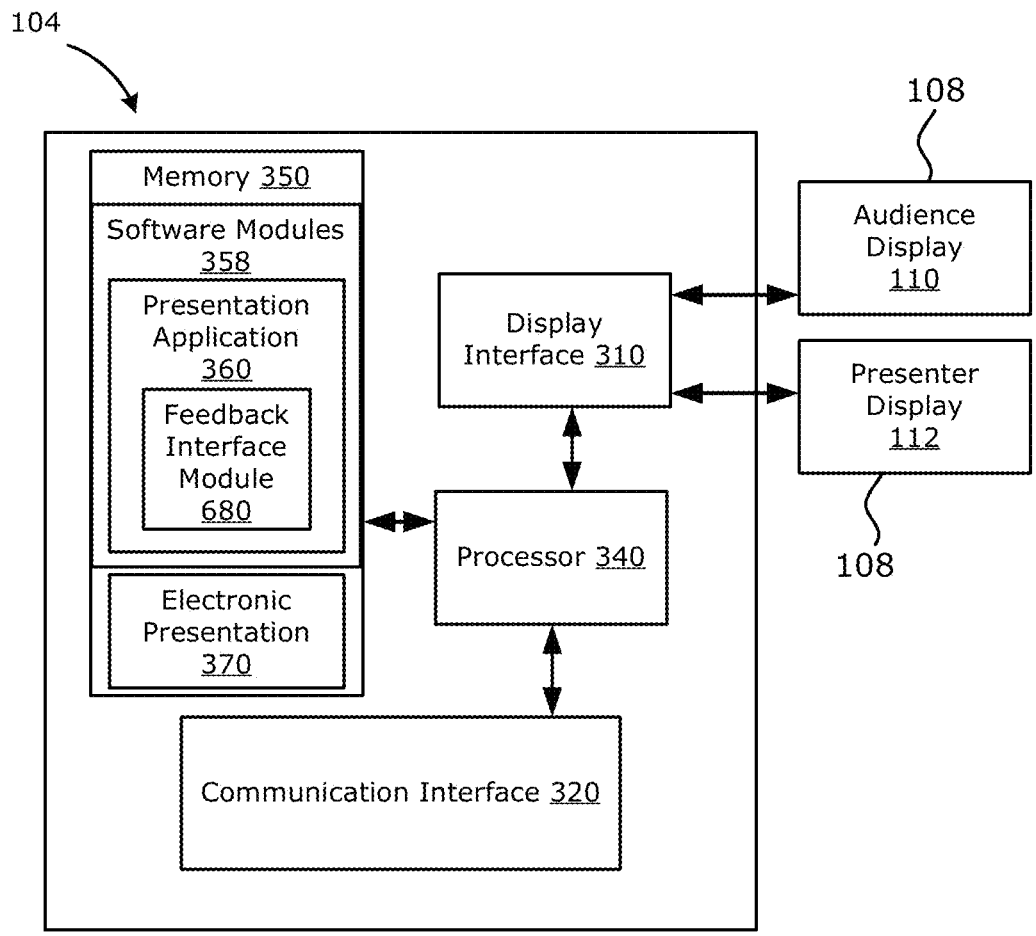
FIG. 6 is a block a diagram of a presentation device which may be used in the feedback providing system of FIG. 5 in accordance with some example embodiments of the present disclosure.

Referring now to FIG. 6, the presentation device 104 may include the features described above with reference to FIG. 3. However, in at least some example embodiments, the presentation device 104 may include one or more software modules, which are configured to perform functions which are similar to the functions provided by the feedback interface server 120 described above with reference to FIG. 4. For example, the feedback interface server 120 may include a feedback interface module 680 which may perform functions similar to those described above with reference to the feedback interface module 480 of FIG. 4. The feedback interface module 680 may, for example, be stored in memory 350 of the presentation device 104. For example, in at least some example embodiments, the presentation application 360 may include the feedback interface module 680. However, in other example embodiments, the feedback interface module 680 may be provided elsewhere.

The feedback interface module 680 is configured to provide a feedback interface 122 (of FIG. 5) for an electronic presentation and to allow one or more of the feedback providing devices 102 to access the feedback interface 122 (of FIG. 5). The feedback interface module 680 is also configured to receive, at the feedback interface 122 (of FIG. 5), feedback information from one or more of the feedback providing devices 102. The feedback interface module 680 is also configured to update the electronic presentation displayed on a display 108 associated with the presentation device based on the received feedback information. The features and functions of the feedback interface module 680 will be described in greater detail below with reference to FIGS. 7 to 9.

The software modules 358 of FIG. 6, may be logically or physically organized in a manner that is different than the manner that is illustrated in FIG. 6. By way of example, in at least some example embodiments, the functions described herein with reference to the feedback interface module 680 may be provided by a plurality of modules.

Example Method for Facilitating Feedback

Figure 7:
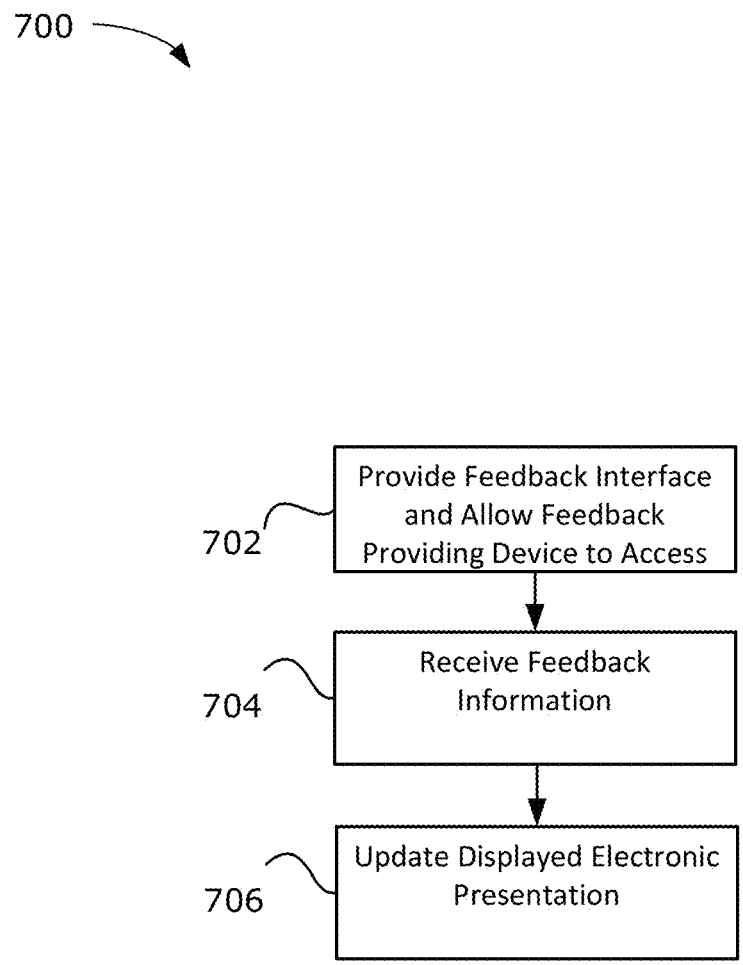
FIG. 7 is a flowchart of a method for facilitating feedback in accordance with example embodiments of the present disclosure.
Figure 8:
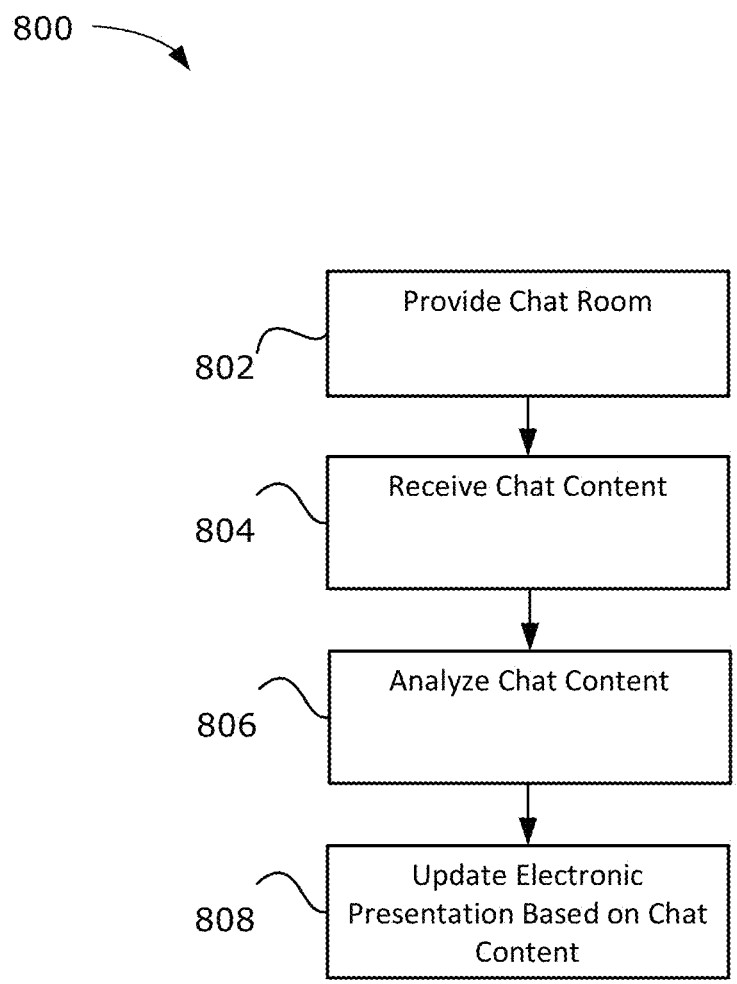
FIG. 8 is a flowchart of a method for facilitating feedback in accordance with example embodiments of the present disclosure.
Figure 9:
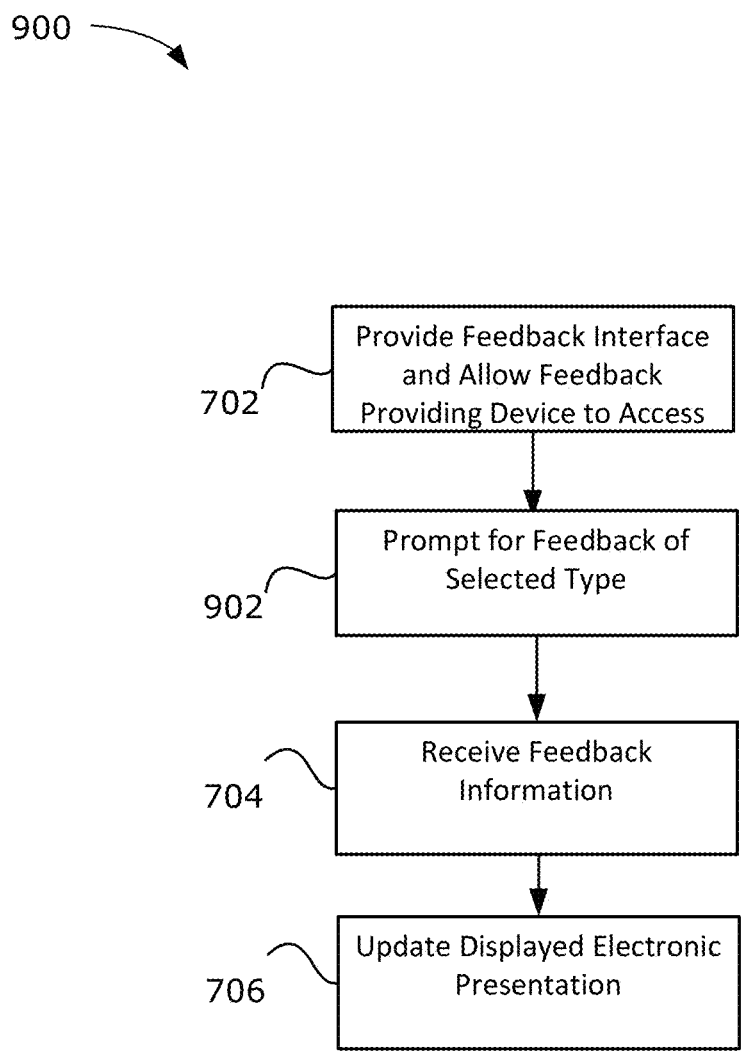
FIG. 9 is a flowchart of a method for facilitating feedback in accordance with example embodiments of the present disclosure.

Reference will now be made to FIGS. 7 to 9 which illustrate example methods 700, 800, 900 of facilitating feedback during a local presentation. The local presentation includes an electronic presentation 370, which may be of the type described above with reference to FIG. 3. The electronic presentation is associated with a presentation application 360 which may be of the type described above with reference to FIG. 3. The electronic presentation is configured for display on a display 108 (of FIG. 1) associated with the presentation device 104 (of FIG. 3).

The methods 700, 800, 900 include features which may be performed by an electronic device such as the presentation device 104 (of FIG. 3), the feedback interface server 120 (of FIG. 4) and/or the feedback providing device 102 (of FIG. 2). One or more applications or modules, such as the feedback interface module 480 of FIG. 4 and/or the feedback interface module 680 of FIG. 6, may contain computer-readable instructions for causing a processor associated with the feedback interface server 120 and/or the presentation device 104 to perform any one or more of the methods 700, 800, 900 of FIGS. 7 to 9. That is, in at least some example embodiments, the feedback interface server 120 is configured to perform any one or more of the methods 700, 800, 900 of FIGS. 7 to 9. In at least some such example embodiments, a feedback interface module 480 or another application or module provided on memory 450 of the feedback interface server 120 may be configured to cause a processor to perform any one or more of the methods 700, 800, 900 of FIGS. 7 to 9. Similarly, in at least some example embodiments, the presentation device 104, which may be of the type illustrated in FIG. 6, may be configured to perform any one or more of the methods 700, 800, 900 of FIGS. 7 to 9. In at least some example embodiments, the feedback interface module 680 (of FIG. 6), which may be provided in memory 350 of the presentation device 104, may be configured to cause a processor associated with the presentation device 104 to perform any one or more of the methods 700, 800, 900.

Any one or more of the features of the methods 700, 800, 900 of FIGS. 7 to 9 may, in at least some example embodiments, be provided by other systems, software applications or other modules apart from other specifically discussed herein.

Referring first to FIG. 7, a flowchart of an example method 700 for facilitating audience feedback during a local presentation is illustrated. At 702, a feedback interface module 480, 680 may provide a feedback interface 122 (of FIG. 1 or 5) for a specific electronic presentation and may allow one or more feedback providing devices 102 (which may be a mobile communication device 201) to access the feedback interface. The feedback interface may be a portal or other interface which allows the feedback providing devices 102 to connect to the feedback interface server 120 or the presentation device 104 in order to provide feedback information. In at least some example embodiments, the feedback interface may take the form of a web page which may be hosted by the feedback interface server 120 or presentation device 104 and which may be provided to the feedback providing devices 102 upon request.

In at least some example embodiments, at 702, feedback interface access information associated with the electronic presentation may be generated. The feedback interface access information may provide access to the feedback interface for a specific electronic presentation. That is, the feedback interface access information may permit the feedback providing devices 102 to provide feedback information for a specific electronic presentation. In some example embodiments, the feedback interface access information may include login information associated with the electronic presentation. The login information may include authorization information such as a user name and/or a password associated with the electronic presentation. Such login information may be displayed to the audience participants within the electronic presentation to ensure that only audience participants permitted to provide feedback information. Such login information may be used by the audience members to access the feedback interface 122 (of FIGS. 1 and 5) for the electronic presentation.

The feedback information access information may, in some example embodiments, be used where the feedback interface server 120 is configured to receive feedback information for more than one electronic presentation. In such example embodiments, the feedback interface server 120 may use the feedback interface access information to associate feedback information with a specific electronic presentation. That is, based on the feedback interface access information, a feedback interface server 120 may determine which electronic presentation the received feedback information should be associated with.

In some example embodiments, the feedback interface access information may be generated at the presentation device 104. In other example embodiments, the feedback interface server 120 may generate the feedback interface access information. Where the feedback interface is generated by the feedback interface server 120, the feedback interface server 120 may provide the feedback interface access information to the presentation device 104.

The feedback interface access information may take other forms apart from those specifically listed above. The feedback interface access information may be any information which may be used to uniquely identify an electronic presentation associated with feedback information. In some example embodiments, the feedback interface access information may include a unique web address associated with the electronic presentation. That is, the electronic presentation may be assigned its own unique web address where the feedback providing devices 102 may access in order to provide feedback information for that presentation.

In some example embodiments, the feedback interface 122 (of FIGS. 1 and 5) may be provided, at 702, by the presentation device 104. For example, in some example embodiments, such as those described above with reference with FIGS. 5 and 6, a feedback interface server 120 may not be used. Instead, the feedback providing devices 102 may provide feedback directly the presentation device 104. For example, the feedback providing devices 102 (such as the mobile communication devices 201 of FIG. 2) may access the feedback interface 122 (of FIGS. 1 and 5) via direct wireless connection to the presentation device 104. In at least some such example embodiments, the feedback interface access information may be a user name, password or other authentication information which allows a connection, such as a wireless connection, to be established between the feedback providing device 102 and the presentation device 104.

In at least example embodiments, after feedback interface access information is generated, the feedback interface access information may be automatically included in the electronic presentation. That is, in at least some example embodiments, the presentation device 104 may automatically update the electronic presentation to include the feedback interface access information. For example, the presentation device 104 may include the feedback interface access information as displayable text in one or more slides of an electronic slide presentation. In some example embodiments, the feedback interface access information may be inserted into the electronic presentation as a header or a footer.

Referring still to FIG. 7, at 704 the feedback interface server 120 and/or the presentation device 104 may receive, via the feedback interface provided at 702, feedback information from one or more of the feedback providing devices 102 (which may be the mobile communication devices 201). In some example embodiments which will be discussed in greater detail below with reference to FIG. 8, the feedback information may be content from a chat room which is associated with the electronic presentation. In some example embodiments, which will be discussed in greater detail below with reference to FIG. 9, the feedback information may be feedback regarding the tone of the presentation, feedback regarding the volume of the presentation, feedback regarding a level of interest of an audience member in the presentation, or feedback regarding the delivery of the presentation.

In some example embodiments, the feedback information may be biosensor data which may be obtained from a biosensor 299 (of FIG. 2) associated with the feedback providing device 102. The biosensor data may, for example, be heartbeat data, which is associated with a heartbeat biosensor 299. Other types of biosensors may also be used. From the biosensor data, the feedback interface server 120 and/or the presentation device 104 may be configured to gauge an audience member's level of interest in the presentation or components of the presentation. For example, an increased heart rate may be indicative of interest in the presentation or a portion of the presentation.

Accordingly, in at least some example embodiments, the feedback information received from the feedback providing device 102 may describe a level of interest of an audience member. While biosensor data may be used in some example embodiments in order to indicate the level of interest, in other example embodiments, other indicia may be used to indicate an audience member's level of interest. For example, in at least some example embodiments, the feedback interface 122 (of FIGS. 1 and 5) may allow an audience member to specifically state their level of interest on a predetermined scale (e.g. on a scale of 1 to 10).

At 706, the electronic presentation displayed on a display 108 associated with the presentation device may be updated based on the received feedback information. As noted previously, in some example embodiments, the presentation device 104 may receive the feedback information directly. In at least some such example embodiments, the presentation device 104 may automatically update the electronic presentation based on the received feedback information. In other example embodiments which include a feedback interface server 120 to act as an intermediary and receive the feedback information, the feedback interface server 120 may update the electronic presentation with the help of the presentation device 104. For example, the feedback interface server 120 may send, to the presentation device 104, feedback information or information derived from such feedback information and the presentation device 104 may update the displayed electronic presentation based on the received feedback information or information derived from the feedback information. Accordingly, 706 may be performed in whole or in part by the presentation device 104 or may be performed by the feedback interface server 120, which may be assisted by the presentation device 104.

In some example embodiments, at 706, the displayed electronic presentation may be updated to include the feedback information itself. In other example embodiments, the feedback interface server 120 and/or the presentation device 104 may perform some analysis on the feedback information to derive other information from the feedback information. For example, feedback information from multiple feedback providing devices 102 may be compiled by the feedback interface server 120 and/or the presentation device 104. In some example embodiments, at 706, the displayed electronic presentation may be updated to include information derived from the feedback information.

In at least some example embodiments, at 706, the electronic presentation may be updated to include text, graphics or other displayable features based on the feedback information or information derived from the feedback information. By way of example, where the feedback information indicates that the presenter is speaking too quietly, the electronic presentation may be updated to indicate to the presenter that they should speak more loudly.

In some example embodiments, the presentation device 104 may be associated with more than one display 108. As noted in the discussion of FIGS. 1 and 3 above, in some example embodiments, the presentation device 104 may be associated with an audience display 110 and also a presenter display 112. In at least some such example embodiments, the presenter may prefer that the audience does not have access to the feedback information. Accordingly, in at least some example embodiments, at 706 only a presenter display 112 is updated. That is, the electronic presentation displayed on the audience display 110 may not be updated based on the feedback information in some example embodiments. The presenter display which is configured for viewing by the presenter, but not the audience, may be updated based on the feedback information.

In some example embodiments, the presentation application 360 (of FIG. 3) may be configured to display a speaker notes section. A speaker notes section is a portion of the electronic presentation which is designed to be viewed by the presenter but not the audience. The speaker notes section is generally used for the speaker to provide themselves with cues, prompts, or other reminders which can be associated with various stages of the electronic presentation. For example, where the electronic presentation is an electronic slide presentation, each slide may be associated with different speaker notes. In at least some such example embodiments, at 706, the speaker notes section of the electronic presentation may be updated to include the feedback information or information derived from the feedback information.

In other example embodiments, at 706, the electronic presentation displayed on an audience display 110 which is configured for viewing by the audience, may be updated based on the received feedback information or information derived from the feedback information. For example, the electronic presentation displayed on the audience display may be updated to include text, graphics, or other displayable features which are indicative of the feedback information.

As noted previously, in some example embodiments, the feedback information may be content from a chat room associated with the electronic presentation. Referring now to FIG. 8, one such example embodiment is illustrated in flowchart form. FIG. 8 illustrates a method 800 for facilitating feedback during a local presentation.

In some such example embodiments, the feedback interface 122 (of FIGS. 1 and 5) may include a chat room which allows the audience to chat during the local presentation. Accordingly, in at least some example embodiments, at 802 the feedback interface server 120 and/or the presentation device 104 may provide a chat room. 802 may be performed, for example, during step 702 of FIG. 7. Accordingly, 802 may include the functions and features described above with reference to 702. For example, in some example embodiments, 802 may include a step of generating feedback interface access information, which may be used in the example embodiment of FIG. 8 to access the chat room associated with the electronic presentation.

At 804 chat content may be received at the feedback interface server 120 and/or the presentation device 104. 804 may be performed at 704 of FIG. 7 and may include the features described above with reference to 704 of FIG. 7. The chat may include several participants who are audience members. The chat room, may be available throughout the electronic presentation and, in at least some example embodiments, before or after the electronic presentation.

At 806 the feedback interface server 120 and/or the presentation device 104 may analyze chat content from the chat room associated with the electronic presentation. In some example embodiments, when analyzing the chat content, the feedback interface server 120 and/or the presentation device 104 may determine the frequency of use one or more words in the chat. That is, the number of times each word is used in the chat may be determined. In some example embodiments, at 806 a word cloud may be created based on the content from the chat. A word cloud is a visual representation of the frequency of use of words in a document or other content. In this case, the word cloud indicates the usage of words in the chat room associated with the electronic presentation. Thus, the word cloud allows a presenter to gauge what audience members are discussing during the presentation.

Other methods of analyzing the chat content may be performed in other example embodiments. In some example embodiments, the analysis may include filtering one or more words from the chat room. For example, words may be filtered from the chat room based on a black list. The black list may, for example, include words which the presenter would not wish to be displayed. For example, vulgar or offensive words may be included in the black list and filtered from the chat content at 806. Similarly, in at least some example embodiments, the chat content may be filtered based on the part of the speech of words or terms used in the chat content. A part of speech is a category to which a word is assigned in accordance with its syntactic functions. For example, a part of speech may be a noun, pronoun, adjective, determiner, verb, adverb, etc. In some example embodiments, certain types of words may be filtered out from the chat content.

At 808, the electronic presentation displayed on a display associated with the presentation device 104 may be updated based on the chat content. 808 may, for example, be performed at 706 of FIG. 7 and may include the features and functions described above with reference to 706 of FIG. 7. For example, in example embodiments in which a word cloud has been generated, the word cloud may be displayed on a display 108 associated with the presentation device 104. Similarly, in some example embodiments, at 808 the electronic presentation displayed on a display may be updated to highlight one or more terms included in the electronic presentation based on usage of those words in the chat room. For example, in some example embodiments, a word may be highlighted based on the frequency use of that word in the chat room. In some example embodiments, if a frequency of use of that word in the chat room exceeds a predetermined threshold, then the word may be highlighted on the electronic presentation.

As discussed above with reference to FIG. 7, in some example embodiments, at 808, only a presenter display 112 may be updated. However, in some example embodiments, at 808, an audience display 110 may be updated.

One or more features of the method 800 may be repeated. For example, in at least some example embodiments, chat content may be received after the electronic presentation is updated at 808. In at least some example embodiments, the electronic presentation may be further updated based on the received feedback information, such as the chat content. For example, where a word cloud is generated, the word cloud may be updated based on further content from the chat.

Reference will now be made to FIG. 9 which illustrates a method 900 for facilitating feedback during a local presentation. The method 900 includes features and functions 702, 704, 706, which are described in greater detail above with reference to FIG. 7. In the method 900 of FIG. 9, when a feedback providing device 102, such as a mobile communication device 201, accesses the feedback interface 122 (of FIGS. 1 and 5), the feedback providing device 102 displays a prompt for feedback of a specified type. That is, the feedback interface server 120 or the presentation device 104 may, at 902, cause the feedback providing device 102 to display a prompt for feedback of a specified type. By way of example, in some example embodiments, the specified type may be feedback regarding the tone of the presentation. In some example embodiments, the specified type may be feedback regarding the volume of the presentation. In some example embodiments, the specified type may be feedback regarding the level of interest regarding the presentation. In some example embodiments, the specified type may be feedback regarding the delivery of the presentation.

The prompt may, in some example embodiments, be provided on a web page which is accessed by the feedback providing device 102. The web page or another graphical user interface, may include one or more selectable interface elements, such as a radio box, a check box, a slider, a button, or a text box, which allows a user of the feedback providing device 102 to input specific feedback information. The user may input such feedback information by interacting with an input interface associated with the feedback providing device 102.

Accordingly, at 704 the feedback information may be received in a manner described above with reference to FIG. 7. Similarly, at 706, the electronic presentation displayed on a display associated with the presentation device may be updated in the manner described above with reference to FIG. 7. By way of example, the electronic presentation displayed on a display may be updated to specify the feedback information regarding the tone of the presentation, feedback information regarding a level of interest regarding the presentation, or feedback information regarding the delivery of the presentation.

The example embodiments described above referred generally to a local presentation. The local presentation, is meant to include an in-person presentation. That is, the local presentation is a live presentation which is generally provided in front of an audience. That is, the example embodiments described above discuss a non-webinar environment. Rather, the local presentation is a traditional presentation. The audience members may, for example, be gathered in a room, such as a lecture hall, auditorium, stadium, or other gathering facility in which the presenter is located.

In some example embodiments, however, the methods and devices described herein may be applied to other types of presentations.

Example Updated Electronic Presentations

Figure 10:
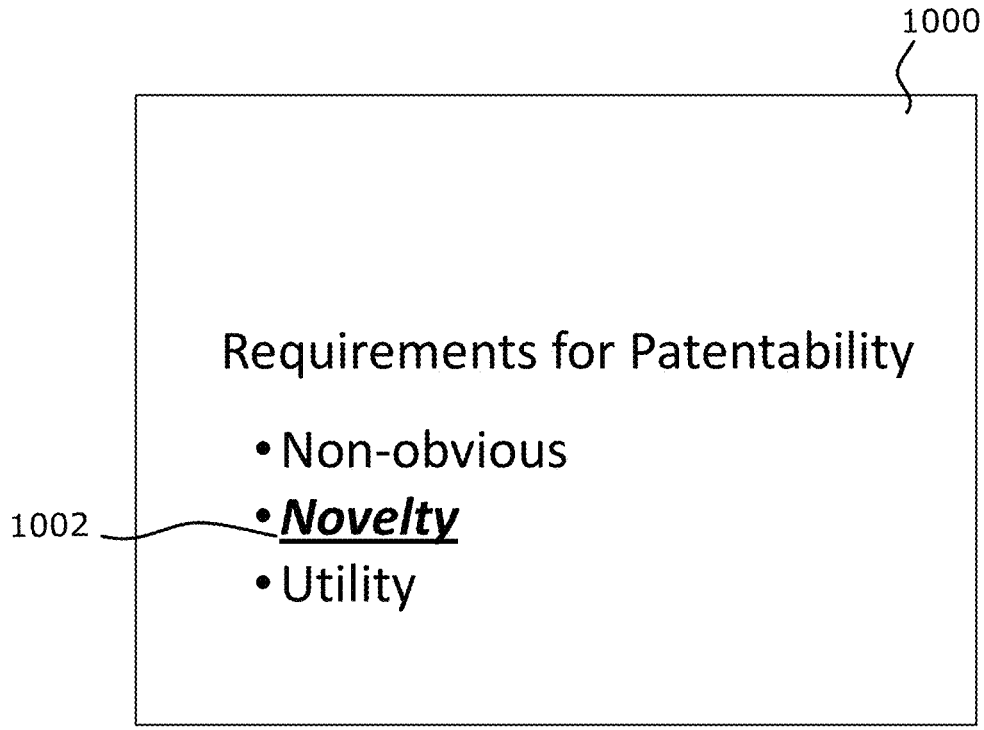
FIG. 10 is an example updated electronic presentation in accordance with example embodiments of the present disclosure.
Figure 11:
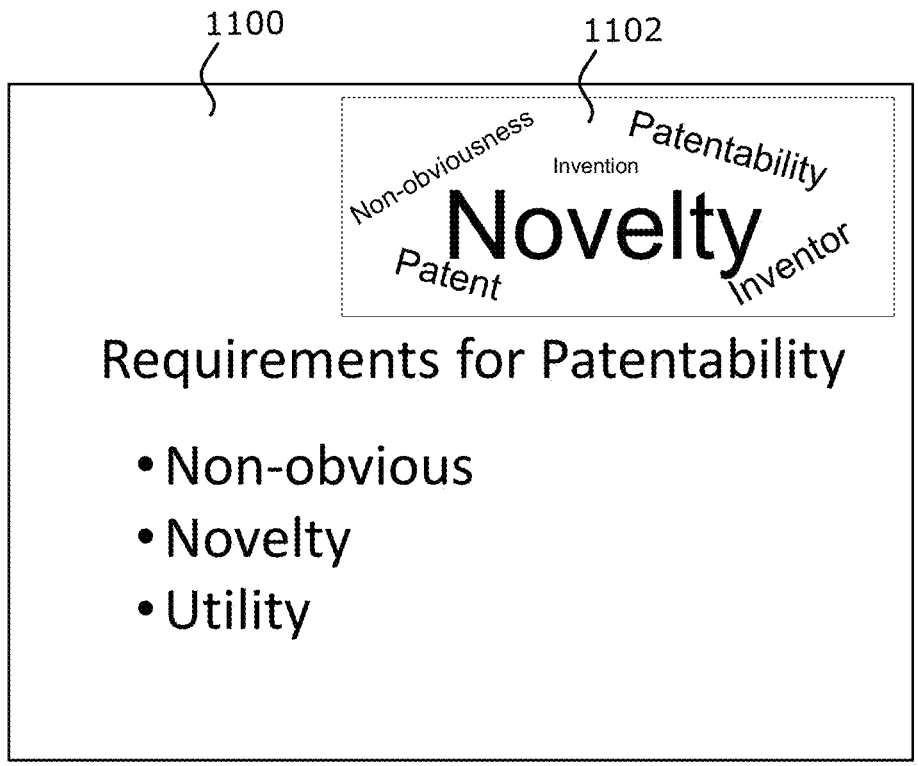
FIG. 11 is an example updated electronic presentation in accordance with example embodiments of the present disclosure.
Figure 12:
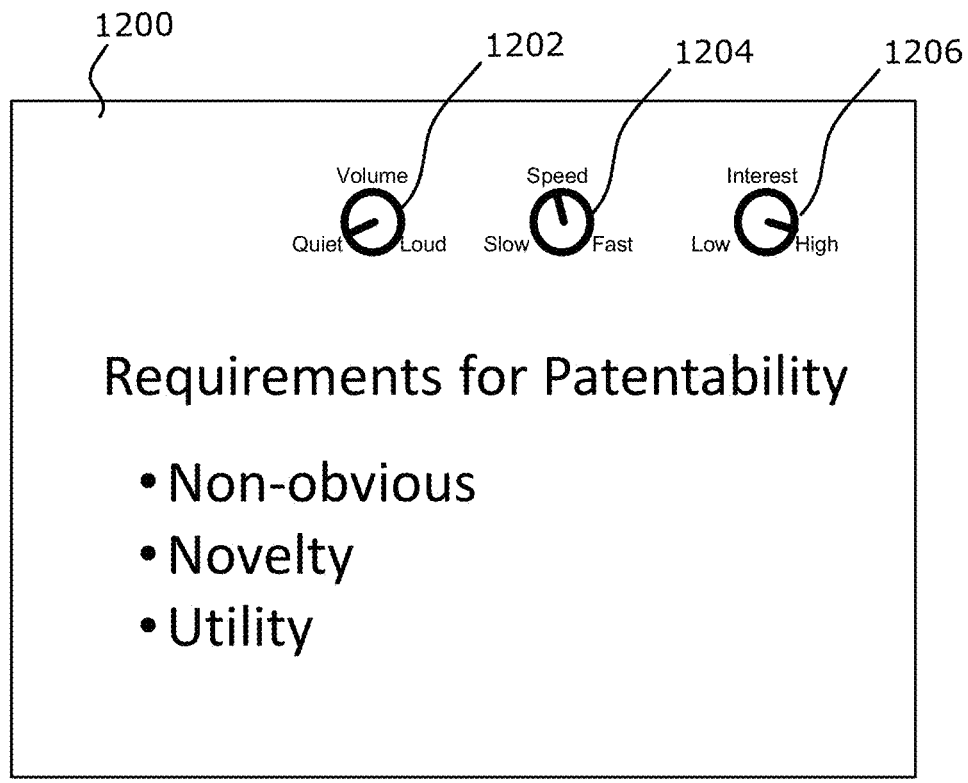
FIG. 12 is an example updated electronic presentation in accordance with example embodiments of the present disclosure.

Referring now to FIGS. 10 to 12, example updated electronic presentations 1000, 1100, 1200 will now be discussed. The example updated presentations 1000, 1100, 1200 may have been updated based on feedback information which was received from one or more feedback providing devices 102.

Referring first to FIG. 10, a first updated electronic presentation 1000 illustrates an electronic presentation which has been updated based on the feedback information to include a highlighted term 1002. That is, a term included in the electronic presentation has been highlighted due to use of that term in the feedback. In the example illustrated, the highlighted term 1002 has been underlined, italicized and boldfaced. In other example embodiment, other highlighting effects may be applied.

Referring now to FIG. 11, a second updated electronic presentation 1100 illustrates an electronic presentation which has been updated based on the feedback information to include a word cloud 1102. The word cloud 1102 identifies words which were included in the feedback information. In the example illustrated, the size of words in the word cloud is used to denote the frequency of use of those words in the feedback information.

Referring now to FIG. 12, a third updated electronic presentation 1200 illustrates an electronic presentation which has been updated based on the feedback information to include indicators 1202, 1204, 1206. In the illustrated example, the indicators are graphical representations of feedback information. A volume indicator 1202 is used to illustrate feedback regarding the volume of the presentation. A speed indicator 1204 is used to illustrate feedback regarding the speed of the presentation and an interest indicator 1206 is used to illustrate feedback regarding the level of interest in the presentation. Other example embodiments may include other types of indicators.

While the present application is primarily described in terms of methods, a person of ordinary skill in the art will understand that the present application is also directed to various apparatus such as a handheld electronic device and a server. The handheld electronic device and the server includes components for performing at least some of the example aspects and features of the described methods, be it by way of hardware components (such as the memory and/or the processor), software or any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present application.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-Ray™ Disc, and a solid state storage device (e.g., NAND flash or synchronous dynamic RAM (SDRAM)).

Example embodiments of the present application are not limited to any particular operating system, system architecture, mobile device architecture, server architecture, or computer programming language.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

What is claimed is:

1. A method of facilitating presentation feedback during a local presentation including an electronic slide presentation displayed on a display associated with a presentation device, the method comprising:
   providing a feedback interface for the electronic slide presentation and allowing one or more mobile communication devices to access the feedback interface;
   receiving at the feedback interface, feedback information from one or more of the mobile communication devices, wherein the feedback interface includes a chat room which allows an audience of the local presentation to chat during the local presentation;

analyzing content of a chat in the chat room, wherein analyzing content of the chat includes determining frequency of use of one or more words in the chat; and automatically updating the electronic slide presentation based on analysis of the content of the chat.

2. The method of claim 1 further comprising:

creating a word cloud based on the content from the chat, and wherein updating the electronic slide presentation displayed on the display associated with the presentation device comprises displaying the word cloud on the display.

3. The method of claim 2 further comprising:

updating the word cloud based on further content from the chat.

4. The method of claim 2 wherein creating a word cloud comprises:

creating the word cloud based on the determined frequency of use of one or more words in the chat.

5. The method of claim 1, wherein updating the electronic slide presentation displayed on the display associated with the presentation device comprises:

highlighting one or more words included in the electronic slide presentation based on usage of those words in the chat.

6. The method of claim 1, wherein the feedback information describes a level of interest of an audience member.

7. The method of claim 1, wherein the feedback information comprises biosensor data.

8. The method of claim 1, further comprising, prior to receiving the feedback information:

when one of the mobile communication devices accesses the feedback interface, causing that mobile communication device to display a prompt for feedback of a specified type.

9. The method of claim 8 wherein the specified type is one of: feedback regarding the tone of the presentation, feedback regarding the volume of the presentation, feedback regarding a level of interest regarding the presentation, or feedback regarding the delivery of the presentation.

10. The method of claim 1 wherein updating the electronic slide presentation displayed on the display associated with the presentation device comprises:

updating the electronic slide presentation displayed on a presenter display, which is configured for viewing by the presenter but not the audience.

11. The method of claim 10, wherein updating the electronic slide presentation displayed on a presenter display comprises updating a speaker notes section of the electronic slide presentation.

12. The method of claim 1 wherein updating the electronic slide presentation displayed on the display associated with the presentation device comprises:

updating the electronic slide presentation displayed on an audience display which is configured for viewing by the audience.

13. The method of claim 1, wherein providing a feedback interface comprises:

generating feedback interface access information associated with the electronic slide presentation, the feedback interface access information providing access to the feedback interface for the electronic slide presentation.

14. The method of claim 13, wherein the feedback interface access information comprises login information associated with the electronic slide presentation.

15. The method of claim 13, wherein the feedback interface is a unique web address associated with the electronic slide presentation.

16. The method of claim 13 wherein the feedback interface is provided by a feedback interface server and wherein the feedback interface server provides the feedback interface access information to the presentation device.

17. The method of claim 13 wherein the presentation device is configured to automatically update the electronic slide presentation to include the feedback interface access information so that the feedback interface access information is displayed to the audience.

18. A presentation device comprising:

a display interface;

a communication interface for communicating with one or more mobile communication devices;

a processor; and a memory containing computer readable instructions for causing the processor to:

provide a feedback interface for an electronic slide presentation and allowing one or more mobile communication devices to access the feedback interface;

receive at the feedback interface, feedback information from one or more of the mobile communication devices, wherein the feedback interface includes a chat room which allows an audience of the local presentation to chat during the local presentation;

analyze content of a chat in the chat room, wherein analyzing content of the chat includes determining frequency of use of one or more words in the chat; and automatically update the electronic slide presentation based on analysis of the content of the chat.

19. A feedback interface server comprising:

one or more communication interfaces for communicating with one or more mobile communication devices and a presentation device;

a processor; and a memory containing computer readable instructions for causing the processor to:

provide a feedback interface for an electronic slide presentation and allowing one or more mobile communication devices to access the feedback interface;

receive at the feedback interface, feedback information from one or more of the mobile communication devices, wherein the feedback interface includes a chat room which allows an audience of the local presentation to chat during the local presentation;

analyze content of a chat in the chat room, wherein analyzing content of the chat includes determining frequency of use of one or more words in the chat; and automatically update the electronic slide presentation based on analysis of the content of the chat.

* * * * *